(12) United States Patent
Lang

(10) Patent No.: US 11,928,389 B2
(45) Date of Patent: Mar. 12, 2024

(54) SMART MUSIC SERVICES PREFERENCES

(71) Applicant: Sonos, Inc., Santa Barbara, CA (US)

(72) Inventor: Jonathan Lang, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/070,063

(22) Filed: Nov. 28, 2022

(65) Prior Publication Data

US 2023/0161551 A1 May 25, 2023

Related U.S. Application Data

(63) Continuation of application No. 17/129,501, filed on Dec. 21, 2020, now Pat. No. 11,513,761, which is a continuation of application No. 16/659,106, filed on Oct. 21, 2019, now Pat. No. 10,871,941, which is a continuation of application No. 15/953,683, filed on Apr. 16, 2018, now Pat. No. 10,452,344, which is a continuation of application No. 14/871,609, filed on Sep. 30, 2015, now Pat. No. 9,946,508.

(51) Int. Cl.
*G06F 3/16* (2006.01)

(52) U.S. Cl.
CPC .................... *G06F 3/165* (2013.01)

(58) Field of Classification Search
CPC . G06F 3/16; G06F 3/165; G06F 11/34; H04L 67/22
See application file for complete search history.

(56) References Cited

U.S. PATENT DOCUMENTS

| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Joseph Saunders, Jr.

(57) ABSTRACT

An example computing device is configured to transmit playback preference tracking information to a media service registered with a media playback system and, after transmitting the playback preference information, (a) determine a first time boundary corresponding to a beginning of a zone scene that causes a first playback device in a first zone of the media playback system to be configured for synchronous playback of media with a second playback device in a second zone of the media playback system, (b) determine a second time boundary corresponding to an end of the zone scene, and (c) transmit, to the media service registered with the media playback system, a request to remove playback preference tracking information received between the first time boundary and the second time boundary.

20 Claims, 6 Drawing Sheets

(56) References Cited

U.S. PATENT DOCUMENTS

| | | |
|---|---|---|
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,402,011 B1 | 3/2013 | Bodenhamer |
| 8,483,853 B1 | 7/2013 | Lambourne |
| 8,942,252 B2 | 1/2015 | Balassanian et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |
| 2010/0146253 A1* | 6/2010 | Kawamoto ............ A63F 13/49 713/1 |
| 2015/0281383 A1 | 10/2015 | Bilinski et al. |
| 2015/0324434 A1 | 11/2015 | Greenwood et al. |
| 2016/0066040 A1 | 3/2016 | Webster et al. |

OTHER PUBLICATIONS

Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Apr. 24, 2017, issued in connection with U.S. Appl. No. 14/871,609, filed Sep. 30, 2015, 13 pages.
Non-Final Office Action dated Apr. 5, 2019, issued in connection with U.S. Appl. No. 15/953,683, filed Apr. 16, 2018, 11 pages.
Notice of Allowance dated Aug. 3, 2022, issued in connection with U.S. Appl. No. 17/129,501, filed Dec. 21, 2020, 5 pages.
Notice of Allowance dated Dec. 12, 2017, issued in connection with U.S. Appl. No. 14/871,609, filed Sep. 30, 2015, 7 pages.
Notice of Allowance dated Aug. 14, 2019, issued in connection with U.S. Appl. No. 15/953,683, filed Apr. 16, 2018, 6 pages.
Notice of Allowance dated Apr. 18, 2022, issued in connection with U.S. Appl. No. 17/129,501, filed Dec. 21, 2020, 8 pages.
Notice of Allowance dated Sep. 2, 2020, issued in connection with U.S. Appl. No. 16/659,106, filed Oct. 21, 2019, 8 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

SMART MUSIC SERVICES PREFERENCES

CROSS-REFERENCE TO RELATED APPLICATIONS

This application claims the benefit of priority as a continuation under 35 U.S.C. § 120 to U.S. application Ser. No. 17/129,501 filed Dec. 21, 2020, entitled "Smart Music Services Preferences," which is a continuation of U.S. application Ser. No. 16/659,106 filed Oct. 21, 2019, entitled "Smart Music Services Preferences," which is a continuation of U.S. application Ser. No. 15/953,683 filed Apr. 16, 2018, entitled "Smart Music Services Preferences," which is a continuation of U.S. application Ser. No. 14/871,609 filed Sep. 30, 2015, entitled "Smart Music Services Preferences," each of which is incorporated by reference herein in its entirety.

FIELD OF THE DISCLOSURE

The disclosure is related to consumer goods and, more particularly, to methods, systems, products, features, services, and other elements directed to media playback or some aspect thereof.

BACKGROUND

Digital music has become readily available due in part to the development of consumer level technology that has allowed people to listen to digital music using personal audio devices. With the increased availability of digital music has come an increased demand for customizability of the listening experience. Users have increasingly demanded the ability to customize the media played, system and device preferences, and various other aspects that make up the experience of listening to digital music.

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
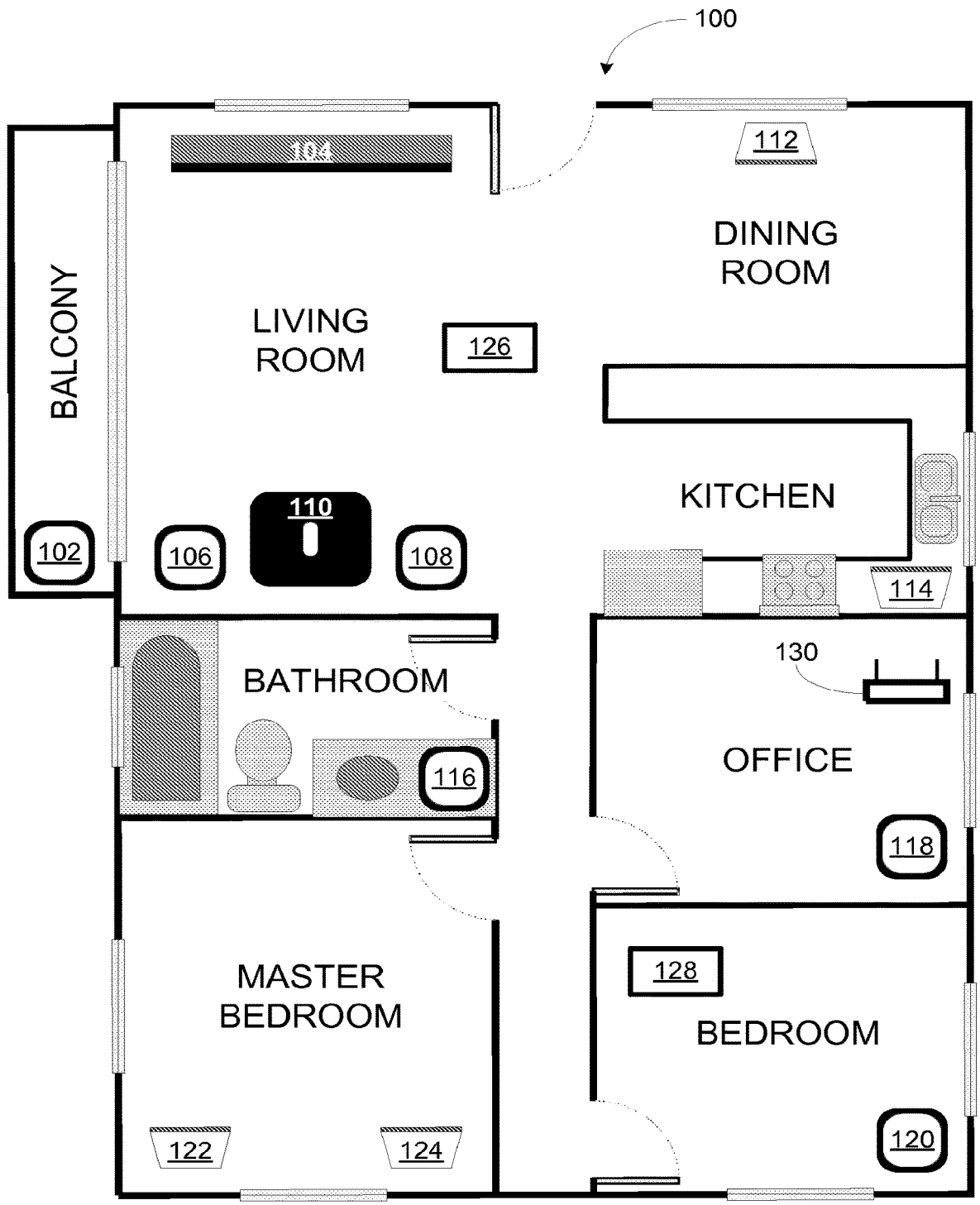
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Media playback systems have become more and more popular as their ability to perform a greater variety of functions and customize playback of media items has increased. In addition, the prevalence of media playback systems in homes, hotels, motels, stores, businesses, and other environments has increased.

According to the present disclosure, a media playback system may include the ability to connect to one or more media services such as Spotify™ or Pandora™, for example. The media playback system may be able to play music, videos, or other media items originating with a connected media service. In addition, many media services include the ability to customize music service preferences of the media service, for instance by allowing a user to like or dislike a song or radio station, or to select a particular media item as a favorite, among other examples.

In some cases, however, it may be preferable to prevent a user of the media playback system from affecting the music service preferences of one or more music services associated with a media playback system for a period of time. In one particular example, a media playback system may be used in a house, and an owner of the system may have certain media service preferences during normal operation. Where the media playback system is used for a party or other social gathering, the owner may wish to prevent music service preferences from being changed by guests for the duration of the party. The owner may have friends over who have different preferences, and the friends may change the music service preferences during the party which may not reflect the owner's preferences, which may not reflect the owner's preferences. For instance, such guests may play music from the service that is different from what the owner likes, or may modify the owner's playlists to include music.

As such, a need exists to allow a media playback system to suspend media service preferences for a period of time, and in some cases revert music service preferences to a pre-defined state. Some example embodiments described herein involve detecting a trigger that suspends playback preference tracking of a media playback system. Example embodiments also involve sending one or more requests to suspend playback preference tracking to one or more media services registered with the media playback system. The example embodiments then involve detecting a particular trigger that resumes playback preference tracking, and based on detecting the particular trigger, sending one or more requests to resume playback preference tracking to one or more of the media services registered with the media playback system.

In one aspect, an example non-transitory computer-readable memory is provided. The non-transitory computer-readable memory has stored thereon instructions executable by one or more processors that, when executed, cause the performance of a set of operations. The set of operations includes (i) detecting a trigger that suspends playback preference tracking of a media playback system that includes one or more playback devices, (ii) sending, to one or more media services registered with the media playback system, one or more requests to suspend playback preference tracking from when the trigger that suspends playback preference tracking was detected, wherein the playback preferences include a playback history indicating media items previously played by the media playback system from the media service, (iii) detecting a particular trigger that resumes playback preference tracking of the media playback system, and (iv) based on detecting the particular trigger, sending, to at least one of the one or more media services registered to the media playback system, one or more requests to resume playback preference tracking of the media playback system, wherein tracking playback preferences of the media playback system comprises tracking media items played by the media playback system from the media service.

In another aspect, an example method may include (i) detecting a trigger that suspends playback preference tracking of a media playback system that includes one or more playback devices, (ii) sending, to one or more media services registered with the media playback system, one or more requests to suspend playback preference tracking from when the trigger that suspends playback preference tracking of the media playback system was detected, wherein the playback preferences include a playback history indicating media items previously played by the media playback system from the media service, (iii) detecting, a particular trigger that resumes playback preference tracking of the media playback system, and (iv) based on detecting the particular trigger, sending, to at least one of the one or more media services registered to the media playback system, one or more requests to resume playback preference tracking of the media playback system, wherein tracking playback preferences of the media playback system comprises tracking media items played by the media playback system from the media service.

In yet another aspect, an example playback device may include one or more processors and a tangible data storage having stored thereon instructions executable by the one or more processors to cause the playback device to perform a set of operations. The operations may include (i) detecting a trigger that suspends playback preference tracking of a media playback system that includes the playback device, (ii) sending, to one or more media services registered with the media playback system, one or more requests to suspend playback preference tracking from when the trigger that suspends playback preference tracking was detected, wherein the playback preferences include a playback history indicating media items previously played by the media playback system from the media service, (iii) detecting a particular trigger that resumes playback preference tracking of the media playback system, and (iv) based on detecting the particular trigger, sending, to at least one of the one or more media services registered to the media playback system, one or more requests to resume playback preference tracking of the media playback system, wherein tracking playback preferences of the media playback system comprises tracking media items played by the media playback system from the media service.

It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a hotel, motel, household, rental property, commercial setting like a restaurant, business, mall or airport, a vehicle like a sports utility vehicle (SUV), bus or car, a ship or boat, an airplane, and so on.

a. Example Playback Devices

Figure 2:
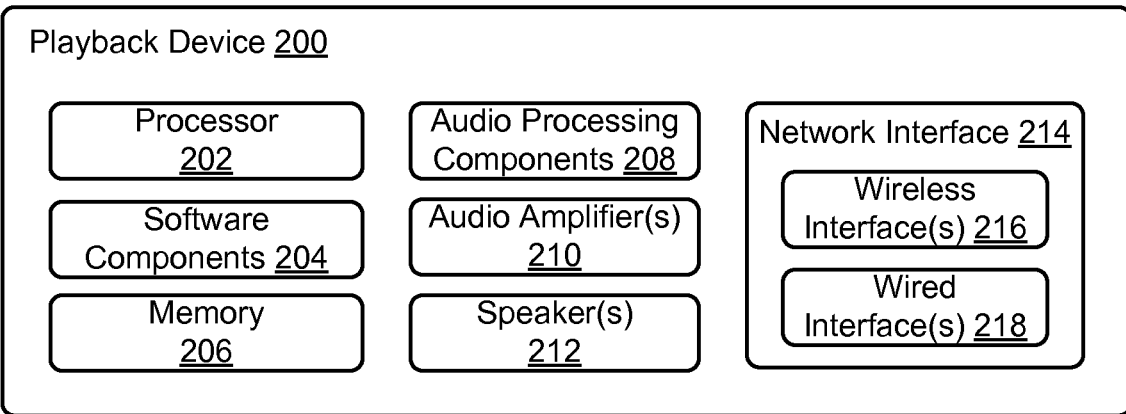
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as, for example, all or part of a pre-determined state of a media playback system playback device 200 is a part of, one or more zones and/or zone groups the playback device 200 is a part of, audio sources accessible by the playback device 200, or a playback queue that the playback device 200 (or some other playback device) may be associated with. In some examples, the memory 206 may store data corresponding to one or more media services associated with the media playback device. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface (s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
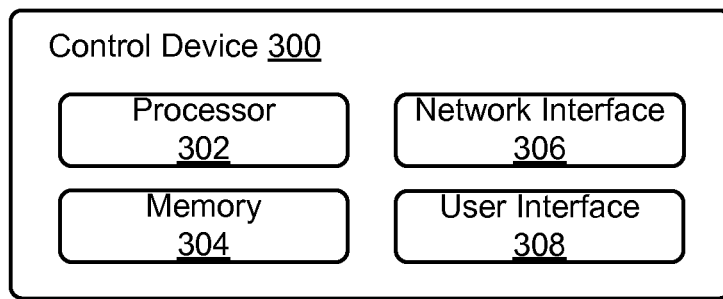
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user. In some examples, the memory 304 may be configured to store data corresponding to one or more media services associated with control device 300.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
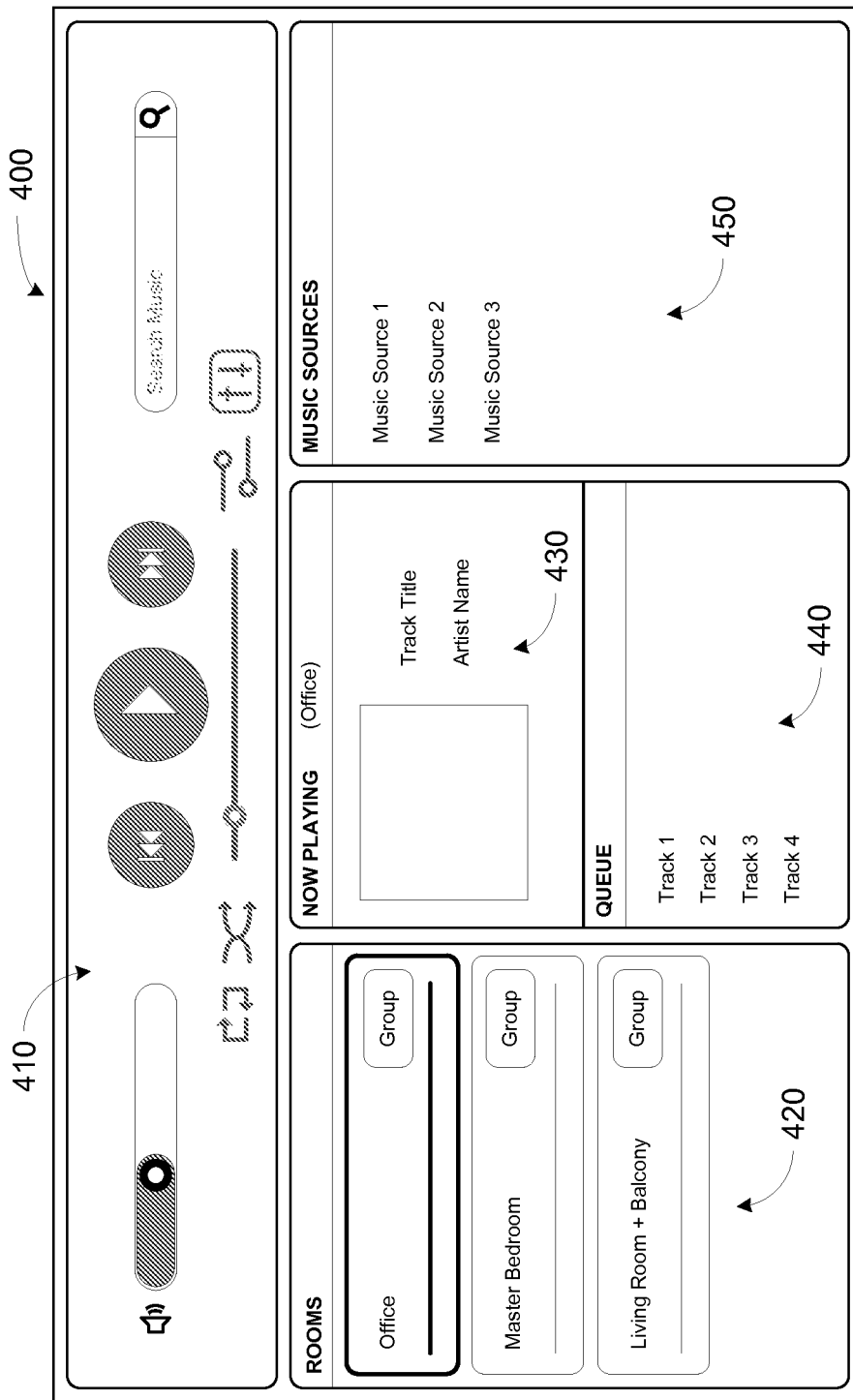
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network device, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Technique to Suspend and Resume Playback Preference Tracking

As discussed above, embodiments described herein may involve suspending and resuming playback preference tracking of a media playback system based on certain conditions.

Figure 5:
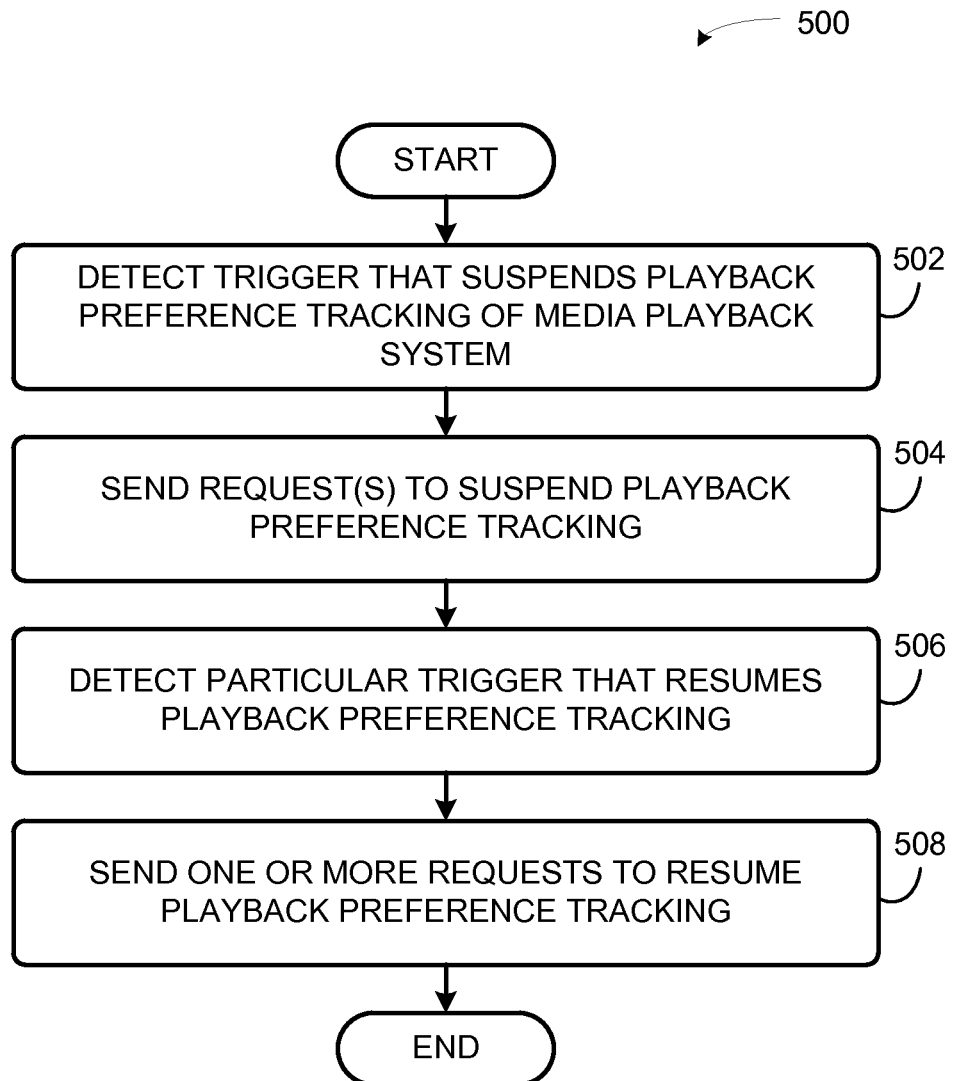
FIG. 5 shows an example flow diagram of an implementation, according to an example embodiment.

FIG. 5 shows a flow diagram of example implementation 500 for suspending playback preference tracking. Implementation 500 presents example techniques that can be implemented within an operating environment involving, for example, the media playback system 100 of FIG. 1, one or more of the playback device 200 of FIG. 2, and/or one or more of the control device 300 of FIG. 3. In one example, the implementation 500 may be performed in whole or in part by a control system in communication with a media playback system. Alternatively, the implementation 500 may be performed by one or more of the playback device 200 of FIG. 2, and/or one or more of the control device 300 of FIG. 3. In such cases, one or more of such systems and/or devices may have installed thereon a software application that includes instructions executable by one or more processors of a respective computing system to cause the respective device(s) or system to perform the functions of implementation 500.

Implementation 500 may include one or more operations, functions, or actions as illustrated by one or more of blocks 502-508. Although the respective blocks are illustrated in sequential order, these blocks may also be performed in parallel, and/or in a different order than those described herein. Also, the various blocks may be combined into fewer blocks, divided into additional blocks, and/or removed based upon the desired implementation. In addition, for the implementation 500 and other processes and methods disclosed herein, the flowcharts show functionality and operation of only a few possible implementations of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementation 500 and other processes and methods disclosed herein, each block may represent circuitry that is wired to perform the specific logical functions in the process.

a. Detect Trigger that Suspends Playback Preference Tracking of a Media Playback System At block 502, implementation 500 may include detecting a trigger that suspends playback preference tracking of a media playback system. In some examples, the trigger may be detected by one or more playback devices and/or control devices that are part of the media playback system, and/or another device or system connected to the media playback system via a wired or wireless connection.

In some examples, the trigger may take the form of a hard button located on a playback device or control device of the media playback system. In other examples, the trigger may be a soft key, a button on a display of a user interface, or an input from a sensor connected to the media playback system, such as a touch sensor, optical sensor, pressure sensor, thermal sensor, motion sensor, or timing device. Other forms are possible as well.

In some examples, the trigger may indicate a request to suspend playback preference tracking by the media playback system. The media playback system may be configured to track playback preferences of the media playback system, such as by storing and/or transmitting to another device or system a history, favorites, or other preferences. The history, favorites, or other preferences may be tracked independently from the tracking by one or more media services associated with the media playback system. For instance, the media playback system may have its own "system favorites," which may include a list of favorited media items across all media services. To further clarify, a media playback system may have multiple media services registered with the media playback system. During operation of the media playback system, a user may select a first media item from a first media service as a favorite, and a second media item from a second media service as a favorite. The media playback system may save the two selected media items as system favorites.

When the media playback system detects a trigger, the media playback system may suspend playback preference tracking, such as by not updating or adding new media items to the system favorites. In some examples, upon detecting the trigger, the media playback system may simply suspend tracking by the media playback system, but not transmit a message to one or more media services registered with the media playback system. In other examples, the media playback system may transmit a message to a server associated with the media playback system but not associated with a media service, such as a "Sonos" server.

In other examples, the trigger may indicate a request for one or more media services to suspend playback preference tracking, or for one or more third-party devices or systems to suspend playback preference tracking. The one or more media services or third party devices may be configured to track playback preferences of the media playback system in order to save the preferences of one or more users of the media service. In some cases, a media service may store a playback history specific to the media items played by the media playback system associated with the specific media service. A media service such as Pandora™ may track playback preferences corresponding to a user's play history, favorites, saved ratio stations, or other preferences, for example. As another example, a media service such as Spotify™ may track playback preferences corresponding a user's saved playlist, followed artists, play history, favorites, saved radio stations, or other preferences. The trigger detected by the media playback system may indicate a request for the media service to stop tracking the songs played by the media playback system, and/or stop updating a history associated with the media playback system.

In some examples, one or more devices of the media playback system may include a user interface and/or a communication interface, which may be configured to detect the trigger via the selection of a selectable control such as a hard button or soft key as discussed above. The interface may be a control interface (e.g., control interface 400 of FIG. 4), and the selectable control may be one control of a plurality of controls on the control interface used to control the media playback system. The selectable control may be displayed on the control interface and, when selected, may suspend playback preference tracking of the media playback system in the manner similar or identical to that described above.

In some examples, the selectable control may be represented by an icon displayed on a screen of the control interface. In other examples, the selectable control may be a button on the control interface, or a selectable object on the control interface. In still other examples, the selectable control may be an icon, button, or other selectable object on a playback device or control device of the media playback system.

In some examples, a media playback system may include a guest access mode in which one or more control devices may connect to and control the media playback system on a temporary basis. For example, an owner of the media playback system may allow a friend to control the media playback system for a short period to access media items on the friend's phone, computer, media service accounts, or from other sources. In some examples, the media playback system entering guest access mode may act as the trigger to suspend playback tracking. In other examples, suspending playback tracking may be one characteristic of the media playback system when it is in guest access mode.

In one example, detecting the selection of a selectable control that suspends playback preference tracking of the media playback system may include detecting the selection of a selectable control that causes two or more zones of the media playback system to join into a zone group in which the two or more zones are configured to play back media in synchrony. Some media playback systems may include two or more zones, such as three zones in a house named "Kitchen," "Living Room," and "Den.". Each zone may include at least one playback device. At a first time, the three zones may be configured to play back media individually from one or more queues, such that different music may be played in each zone simultaneously. At a second time, the example media playback system may detect the selection of a selectable control that joins two of more of the zones. For instance, a user may select a selectable control that causes the "Kitchen" and "Living Room" zones to be joined into a zone group. The zone group may be configured to play music in synchrony in the zones joined to the zone group, while allowing different music or media items to be played in the zone that was not joined to the zone group. A host may opt to group two or more zones when hosting a party, so as to have the same music being played in multiple rooms of the home during the party.

To clarify further, an example house may include zones named "Alice Bedroom," "Bob Bedroom," and "Charlie Bedroom." A user may be able to define certain zone groups such that playback preference tracking for the zone of the media playback system is suspended. The suspension of playback preference tracking may occur based on the media playback system joining the zones into the zone group (i.e., acting as a trigger), or may be a characteristic of the zone group itself (i.e., no playback preference tracking when the zone group exists).

In one case, a user may wish to suspend playback preference tracking for a first zone group including "Alice Bedroom" and "Bob Bedroom" because Alice and Bob have different tastes in music. The user may also wish to allow playback preference tracking for a second zone group including "Bob Bedroom" and "Charlie Bedroom" because Bob and Charlie have similar taste in music. A characteristic of the first zone group may be that playback preferences are not tracked, while a characteristic of the second group is that playback preferences are tracked. Alternatively, the act of joining the zones into the first or second zone groups may act as a trigger that suspends playback preference tracking (or not, as in the case of the second zone group). In any case, the user may be able to define a zone or zone group such that playback preference tracking is suspended for that zone or zone group, but remains active for other zones and zone groups of the media playback system.

In other examples, detecting the selection of a selectable control that suspends playback preference tracking of the media playback system may include detecting the selection of a selectable control that causes all zones of the media playback system to join into a zone group in which the two or more zones are configured to play back media in synchrony. Some media playback systems that include two or more zones, such that each zone includes at least one playback device, may be configured to join all zones of the media playback system into a zone group. The zone group may allow all the zones to play back media in synchrony. In still other examples, the media playback system may be a single zone.

Detecting the trigger that suspends playback preference tracking of the media playback system may include, in some examples, detecting the initiation of a new session between a given media service and the media playback system. One or more media services may be associated with the media playback system, such as Pandora™, Spotify™, Rhapsody™, Google Play Music Slacker™, TuneIn™, Iheartradio™, Deezer™, Last.fm™, Rdio™, SiriusXM™, Song1™, Wolfgang's Vault™, and Stitcher SmartRadio™. The initiation of a new session may involve the media playback system communicating with one or more devices or systems associated with the media service, such as a server or database. In some examples, detecting the initiation of a new session may involve performing a registration of one or more accounts with the media service, or signing into an account already registered with the media service. In other examples, detecting the initiation of a new session may involve detecting that a session has been reset, or that a user has signed out of an account associated with the media service. Other examples are possible as well.

In some examples, a media playback system may include one or more zone scenes. A zone scene may include a set of zones dynamically linked together. The zones may be linked together based on a time of day or time of the week. For instance, a "Morning" zone scene may include Bedroom, Office, and Kitchen zones joined together from 7:00 am until 10:00 am every day of the week. In some cases, the zone scene may be created using a single command, such as a mouse click, a double mouse click, a button press, a gesture, or some other programmed or learned action. Without this single command, the user would manually and individually link each zone.

The media playback system may store data that defines the zone scene, including one or more characteristics of the zone scene such as the names of the included zones, the beginning and end times, and the days of the week. One additional characteristic of the zone scene may be that playback preference tracking is suspended when the zone scene is active. As such, playback preference tracking may be suspended based on the characteristics of the zone scene itself.

In another example, detecting the trigger that suspends playback preference tracking of the media playback system may include detecting that a current day and time of the week is a particular day and time corresponding to a zone scene. In that case, playback preference tracking may be suspended based on the time of day and day of the week corresponding to a zone scene, instead of based on a characteristic of the zone scene itself.

The media playback system may detect a trigger that suspends playback preference tracking based on the zone scene, either based on the time of day or based on a characteristic of the zone scene itself, as described above. For instance, the media playback system may suspend playback preference tracking during every "Morning" zone scene, i.e. every morning at 8:00 am. Alternatively, a media playback system may include a "Party" zone scene, and playback preference tracking may be suspended when the media playback system enters the "Party" zone scene. A zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

b. Send Request(s) to Suspend Playback Preference Tracking

At block 504, implementation 500 may include sending one or more requests to suspend playback preference tracking. The one or more requests may be sent to one or more media services registered with the media playback system, such as those listed above. The requests may cause the one or more registered media services to suspend playback preference tracking beginning from the time the trigger was detected by the media playback system (or shortly thereafter, e.g., before changes are made). In some examples, the request may cause the media service to retroactively suspend playback preference tracking. The request may include timing information that allows the media service to retroactively remove changes to preferences that were made prior to when the request was sent. In other examples, the media service may only suspend playback preference tracking beginning from the time the request was sent by the media playback system.

In some examples, the playback preferences may include a playback history indicating media items previously played by the media playback system from the media service. The one or more requests sent from the media playback system may cause the one or more media services to suspend making modifications to the playback history, for example by not adding any additional media items to the history.

In other examples, the media service may modify the playback history, for example by adding or removing media items. In some cases, a media item may have been erroneously added or deleted from a list, in which case the media service may modify a playback history based on the request sent by the media playback system, and may add or remove one or more media items from the playback history.

In some examples, the one or more media services may modify one or more settings based on the request. For instance, a media service may have an associated playback history indicating media items previously played, as well as one or more other stored characteristics (e.g., favorite songs, radio stations, "liked" or "disliked" songs, etc. . . . ) associated with the media playback system or an account present on the media playback system. The media service may add, remove, or modify one or more of the stored characteristics based on the request sent form the media playback system.

In some examples, the request may conform to an application programming interface (API) provided by a given media service. Such an API may provide a known set of operations by which the media playback system can interface with the media service. For instance, an example API operation may include a request to suspend playback preference tracking beginning and/or ending at a particular time, or until a subsequent message is received.

c. Detect Particular Trigger that Resumes Playback Preference Tracking

As discussed above, the various blocks of FIG. 500 may be performed in a different order than shown, and/or one or more blocks may be removed based upon a desired implementation. For example, blocks 502 and 504 may be performed without performing blocks 506 and/or 508 while remaining within the scope of the invention.

At block 506, implementation 500 may include detecting a particular trigger that resumes playback preference tracking of the media playback system. The particular trigger may be similar or identical to the examples described above with reference to the trigger that suspends playback preference tracking, albeit a trigger indicating that playback preference tracking is to be resumed. For example, the particular trigger may take the form of a hard button located on a playback device or control device of the media playback system. In other examples, the trigger may be a soft key, a button on a display of a user interface, or an input from a sensor connected to the media playback system, such as a touch sensor, optical sensor, pressure sensor, thermal sensor, motion sensor, or timing device, for example. Other forms are possible as well.

In some examples, the particular trigger that resumes playback preference tracking may be a particular trigger that indicates a request from a user to resume playback preference tracking. For instance, a user may wish to resume one or more functions of the media service that were suspended, such as storing songs played, storing favorites, or storing the ratings of one or more media items. The user may indicate a request to resume tracking by pressing a button or selecting a selectable control, that causes the tracking to resume. In some examples, responsive to receiving the particular trigger, the media playback system itself may resume playback preference tracking. In a case where the media playback system stores one or more preferences, such as a history, favorites, or something else, the media playbacks system may resume tracking these preferences in response to receiving the particular trigger.

In other examples, the particular trigger may indicate a request for one or more media services to resume playback preference tracking, or for one or more third-party devices or systems to resume playback preference tracking. The one or more media services may track playback preferences corresponding to a user's history, favorites, saved ratio stations, or other preferences, for example. The particular trigger detected by the media playback system may indicate a request for the media service to resume tracking the songs played by the media playback system, and/or resume updating a history associated with the media playback system. In some cases, a media service may resume storing a playback history specific to the media items played by the media playback system associated with the specific media service.

In some examples, detecting the particular trigger that resumes playback preference tracking of the media playback system may include determining that at least one zone has been removed from the zone group. In an example where the media playback system includes one or more zone groups made up of one or more zones, the particular trigger may be detected by determining that one or more zones has been removed. For instance, a user of the media playback system may remove one zone from the zone group using a playback device or a control device, such as by disconnecting a playback device from the system or by selecting a selectable control on the control device. In another example, a zone may be removed from a zone group based on a particular time. For instance, a zone might be joined to a zone group every morning at 8:00 am and removed from the zone group at 10:00 am, based on a zone scene, for example. Other examples are possible as well.

In some examples, the particular trigger that resumes playback preference tracking may include the media playback system detecting the selection of a selectable control that resumes playback preference tracking. The selectable control may be one control of a plurality of controls on the control interface used to control the media playback system. The selectable control may be displayed on the control interface and, when selected, may resume playback preference tracking of the media playback system. In some examples, the selectable control may be represented by an icon displayed on a screen of the control interface. In other examples, the selectable control may be a button on the control interface, or a selectable object on the control interface. In still other examples, the selectable control may be an icon, button, or other selectable object on a playback device or control device of the media playback system.

In some examples, the particular trigger that resumes playback preference tracking may include detecting that a pre-defined period of inactivity by the media playback system has elapsed. For instance, the media playback system may detect that a pre-defined period of inactivity has elapsed after the system received the trigger suspending playback preference tracking. The pre-defined period of inactivity may be short, such as a few seconds, or longer, such as a few minutes, hours, or even days. In a particular example, the media playback system may be configured such that particular trigger includes detecting one hour of inactivity after the media playback system and/or media services suspend playback preference tracking. Once the hour has elapsed, the system and/or media services may resume playback preference tracking.

In some examples, the particular trigger that resumes playback preference tracking may include detecting that a media playback system is no longer in a guest access mode. Where a media playback system is currently in a guest access mode, in which one or more control devices are able to connect to and control the media playback system on a temporary basis, the media playback system may be configured to exit the guest access mode and return to a default mode. In some examples, the media playback system exiting guest access mode may act as the trigger to resume playback preference tracking. In other examples, a characteristic of guest access mode may be to suspend playback preference tracking, and when the media playback system is no longer in the guest access mode, the media playback system may resume playback preference tracking automatically, based on a default characteristic of the system (i.e., playback preferences are tracked under normal operation), or for another reason.

d. Send Request(s) to Resume Playback Preference Tracking

At block 508, implementation 500 may include based on detecting the particular trigger, sending one or more requests to resume playback preference tracking of the media playback system. In some examples, a media service resuming playback preference tracking may include tracking media items played by the media playback system from the media service. For instance, where two media services are registered with the media playback system, two respective requests to resume playback preference tracking may be sent, and each media service may respectively resume playback preference tracking for only those media items associated with the respective media service.

In some examples, implementation 500 may also include determining a state of the media service corresponding to when the trigger suspending playback preference tracking of the media playback system was detected. Such a state may include a playback history indicating media items previously played by the media playback system from the media service and one or more playlists of media items associated with the media playback system. The state of the media service may include the settings and characteristics of the media playback system, as well as one or more playback preferences specific to one or more media services registered with the media playback system. In some cases, the state may include a playback history associated with each media service, such that the playback history of a particular media service only includes media items previously played by the media playback system that are associated with the particular media service.

In some cases, the state of the media service may be determined based on a time prior to when the trigger suspending playback preference tracking was detected. For instance, a user may wish to retroactively suspend playback preference tracking for a given time period, but did not trigger the initial suspension. The user may then, at a later time, retroactively trigger the suspension of playback preference tracking. In this way, the state of the media playback system may be determined prior to the time that a trigger is detected by the media playback system. This implementation is discussed in further detail below.

In additional examples, implementation 500 may also include, based on detecting the particular trigger, sending, to at least one of the one or more media services registered to the media playback system, one or more requests to revert to the determined state of the media service such that the playback history excludes media items played by at least one of the one or more playback devices while playback preference tracking of the media playback system was suspended. For instance, the state of the media playback system may include data corresponding to one or more playback preferences associated with one or more media services. The media playback system may send one or more requests to the media services, which may cause the media services to remove one or more media items from a playback history, such that the playback history reverts back to the state when the trigger suspending playback preference tracking was initially detected. In other examples, the media playback system may send one or more requests that cause one or more media services to modify one or more other preferences associated with the media service, such as a list of favorite media items.

In some examples, determining the state of the media service corresponding to when the trigger suspending playback preference tracking of the media playback system was detected may include determining a state of the media service that includes one or more favorite media items saved to the media service. For instance, the state of the media playback system may be determined based on when a media item was deemed a favorite. In other cases, the state of the media playback system may be determined based on one or more characteristics of a favorite media item. In still other cases, the state of the media service may include only those media items that are favorites, such that when the one or more media services resume playback preference tracking, only those media items that were deemed as favorites are included in the playback history. Other examples are possible as well.

IV. Example Technique to Suspend Playback Preference Tracking

Figure 6:
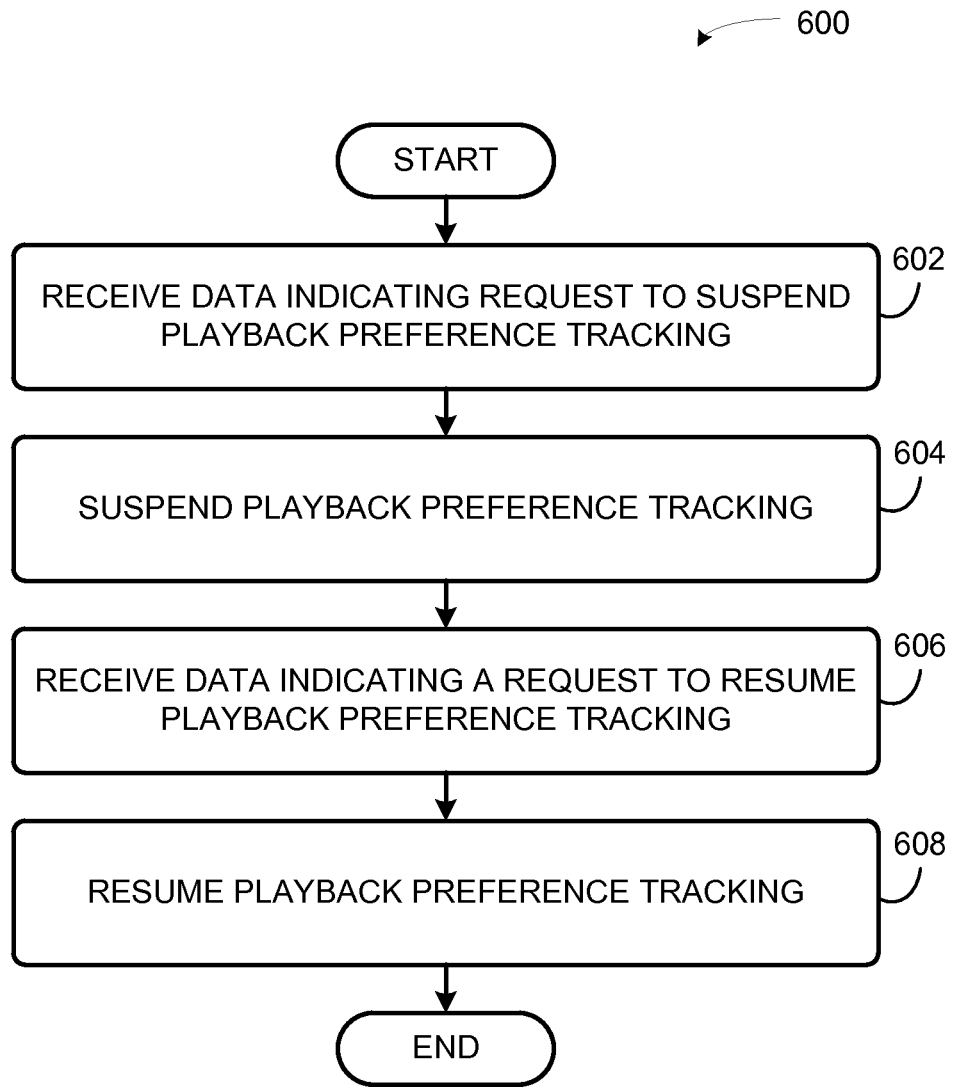
FIG. 6 shows an example flow diagram of an implementation, according to an example embodiment.

FIG. 6 shows a flow diagram of example implementation 600 for suspending playback preference tracking. Implementation 600 presents example techniques that can be implemented within an operating environment involving a server connected to, for example, the media playback system 100 of FIG. 1, one or more of the playback device 200 of FIG. 2, and/or one or more of the control device 300 of FIG. 3. In one example, the implementation 600 may be performed in whole or in part by a server in communication with a media playback system. In such a case, the server may have installed thereon a software application that includes instructions executable by one or more processors of the server to cause the server to perform the functions of implementation 600.

Implementation 600 may include one or more operations, functions, or actions as illustrated by one or more of blocks 602-608. Although the respective blocks are illustrated in sequential order, these blocks may also be performed in parallel, and/or in a different order than those described herein. Also, the various blocks may be combined into fewer blocks, divided into additional blocks, and/or removed based upon the desired implementation. In addition, for the implementation 600 and other processes and methods disclosed herein, the flowcharts show functionality and operation of only a few possible implementations of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementation 600 and other processes and methods disclosed herein, each block may represent circuitry that is wired to perform the specific logical functions in the process.

A server may perform implementation 600, and may include a processor, communication interface, user interface, and/or data storage. The processor may include one or more general purpose processors, central processing units (CPUs), CPU cores, and/or one or more special purpose processors (e.g., graphics processing units (GPUs), digital signal processors (DSPs), field programmable gated arrays (FPGAs), or application specific integrated circuits (ASICs)). The processor may be configured to execute computer-readable instructions contained in a data storage unit and/or other instructions described herein.

The communication interface may be configured to allow the server to communicate with one or more devices or systems, such as the media playback system, according to one or more protocols. In one example, the communication interface may be a wired interface, such as an Ethernet interface or Universal Serial Bus (USB) interface. As another example, the communication interface may be a wireless interface, such as a cellular or WI-FI interface. Other example communication interfaces may include a fiber-optic link interface, coaxial cable interface, Bluetooth, ZigBee, WiMAX, wireless wide-area network (WWAN), and/or other similar type of interface.

The user interface of the server may facilitate interaction with a user of the server, if applicable. As such, the user interface may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system.

The data storage may include one or more volatile, non-volatile, removable, and/or non-removable storage components, such as magnetic, optical, or flash storage, and may be integrated in whole or in part with the processor. Further, the data storage may take the form of a non-transitory computer-readable storage medium, having stored thereon program instructions (e.g., compiled or non-compiled program logic and/or machine code) that, when executed by the processor, cause the server to perform one or more functions or acts, such as those described in this disclosure. Such program instructions may define or be part of a discrete software application that can be executed in response to certain input received via the communication interface or user interface, for instance. The data storage may also store other types of information or data, such as those types described throughout this disclosure.

Implementation 600 may be similar or identical to implementation 500 in some respects. As such, one or more examples described with respect to implementation 500 may apply to implementation 600 as well.

a. Receive Data Indicating Request to Suspend Playback Preference Tracking

At block 602, implementation 600 may include receiving data indicating a request to suspend playback preference tracking of a media playback system. In some examples, the data may be sent by a media playback system (such as media playback system 100 of FIG. 1) and received by a server via a communication interface. In other examples, the data may be sent by one or more devices or systems connected to the media playback system, and received by the server via a communication interface of the server. The request to suspend playback preference tracking may follow a trigger, such as the trigger discussed above with reference to FIG. 5.

b. Suspend Playback Preference Tracking

At block 604, implementation 600 may include suspending playback preference tracking. In some embodiments, the server may be involved in playback preference tracking itself. In such cases, the server may suspend playback preference tracking based on receiving a request to suspend playback preference tracking. Alternatively, the server may be involved in providing a media streaming service, but not necessarily involved in playback preference tracking itself. In such embodiments, the server may send one or more requests to one or more additional servers to suspend playback preference tracking. Yet further, in some cases, the server may be involved in providing a cloud service that does not necessarily provide streaming media. In such cases, the server may send one or more requests to one or more media services by the server. Within examples, such requests sent by the server may cause one or more registered media services to suspend playback preference tracking beginning from the time the server received the data indicating the request to suspend playback preference tracking (or shortly thereafter). Other examples described above with respect to block 504 may apply to block 604 as well, albeit performed by the server.

c. Receive Data Indicating a Request to Resume Playback Preference Tracking

At block 606, implementation 600 may include receiving data indicating a request to resume playback preference tracking. The request to resume playback preference tracking may be similar or identical to the request to suspend playback preference tracking described with reference to block 602. Further, one or more examples described with reference to block 506 may apply to block 606 as well. For instance, the request to resume playback preference tracking may be sent by one or more devices of the media playback system, or by one or more third-party devices or systems.

d. Resume Playback Preference Tracking

At block 608, implementation 600 may include resuming playback preference tracking. For example, the server may resume playback preference tracking itself. Alternatively, the server may send one or more requests to one or more servers of one or more media services that cause playback preference tracking to be resumed. One or more examples described with reference to block 508 may apply to block 608 as well.

V. Example Technique to Retroactively Remove Tracked Playback Preferences

Figure 7:
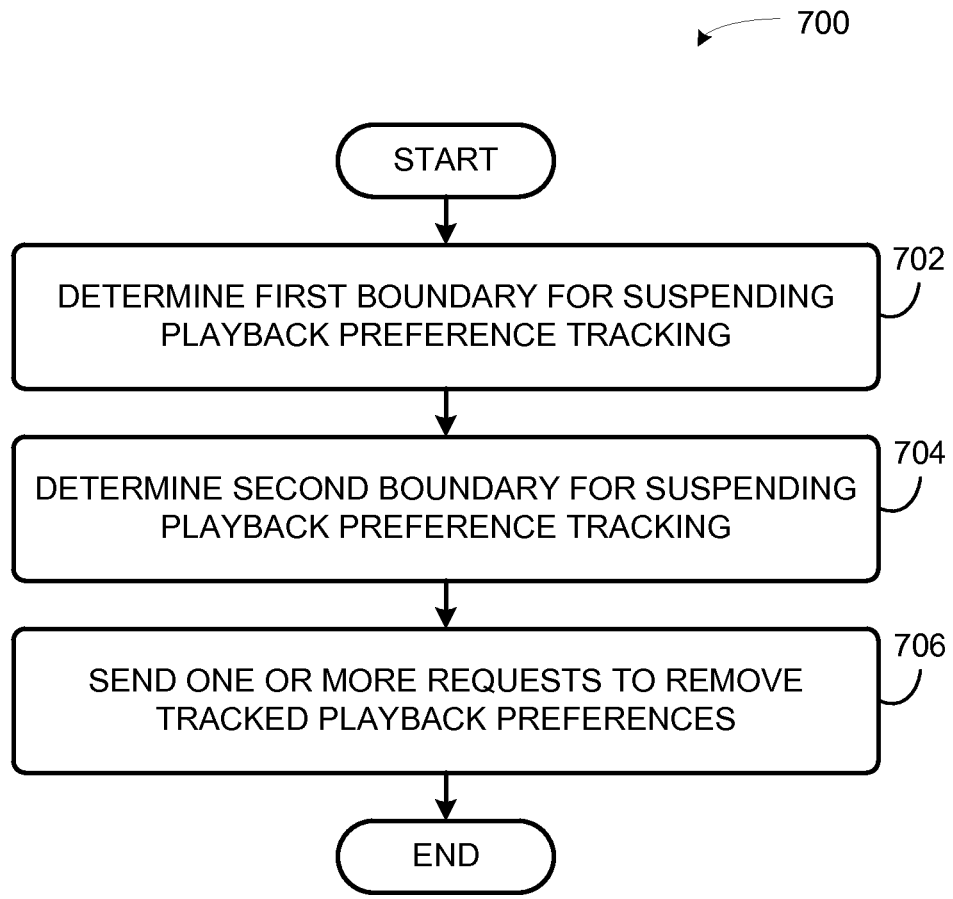
FIG. 7 shows an example flow diagram of an implementation, according to an example embodiment.

FIG. 7 shows a flow diagram of example implementation 700 for retroactively removing tracked playback preferences. One or more of blocks 702-706 may be performed within an operating environment such as those described with reference to FIGS. 5 and 6. Further, one or more examples described with reference to FIGS. 5 and/or 6 may apply to FIG. 7 as well.

In some examples, a user may be given the option to remove one or more tracked playback preferences retroactively. For instance, a user may want to disregard all changes made in the past hour. Implementation 700 is an example technique for retroactively removing track playback preferences.

a. Determine First Boundary for Suspending Playback Preference Tracking

At block 702, implementation 700 may include determining a first boundary for suspending playback preference tracking of a media playback system. The first boundary may be an objective point in time, such as 10:00 μm, or a relative point in time, such as 3 hours ago. In other examples, the first boundary may correspond to an event that occurred in the media playback system. For instance, the first boundary may correspond to a trigger, such as the trigger described with reference to FIG. 5. In that case, an example first boundary may correspond to the point in time when the media playback system entered a "Party" mode, or several zones were grouped together to create a zone group. Other examples described with reference to the trigger in FIG. 5 apply as well.

b. Determine Second Boundary for Suspending Playback Preference Tracking

At block 704, implementation 700 may include determining a second boundary for suspending playback preference tracking. In some examples, the second boundary may correspond to a point in time or a trigger as described with reference to block 702 and FIG. 5.

The second boundary may be used to set an end point, such that tracked preferences that occurred between the first boundary and the second boundary should be removed from tracked playback preferences. For instance, the second boundary may be the current time, such that tracked preferences that occurred from the first boundary to the current time should be removed, and playback preference tracking is resumed from the current time forward. In other examples, the second boundary may be the current time, such that tracked playback preferences from the first boundary to the current time are removed, and playback preference tracking is suspended from the current time onward. In still other examples, the second boundary may be a future point in time, such that tracked playback preferences from the first boundary to the current time should be removed, and playback preference tracking is suspended from the current time until the future point in time. Other examples are possible as well.

c. Send One Or More Requests to Remove Tracked Playback Preferences

At block 706, implementation 700 may include sending one or more requests to remove tracked playback preferences. In some examples, the media playback system or a server connected to the media playback system may send the request to one or more media services registered with the media playback system. The request may include the first and second boundaries, and may cause the media service to remove some or all of the playback preferences that were tracked between the first boundary and the second boundary. The request may also include an indication for future playback preference tracking by the media service, such as a request to suspend or resume playback preference tracking at a current or future time.

In addition, for implementations 500, 600, and 700, and other processes and methods disclosed herein, the flowcharts show functionality and operation of a few possible implementations of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementation 500 and other processes and methods disclosed herein, each block in FIG. 5 may represent circuitry that is wired to perform the specific logical functions in the process.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves controlling a media playback system such that it can suspend media service preferences for a period of time, and in some cases revert changes that have been made to a pre-defined state. In one aspect, a non-transitory, computer-readable memory is provided. The non-transitory, computer-readable memory has stored thereon instructions executable by a computing device to cause the computing device to perform functions. The functions may include detecting a trigger that suspends playback preference tracking of a media playback system. The functions may also include sending, to one or more media services registered with the media playback system, one or more requests to suspend playback preference tracking from when the trigger that suspends playback preference tracking was detected. The functions may also include detecting a particular trigger that resumes playback preference tracking of the media playback system. The functions may further include, based on detecting the particular trigger, sending, to at least one of the one or more media services registered to the media playback system, one or more requests to resume playback preference tracking of the media playback system.

In another aspect, a method involves method involves detecting a trigger that suspends playback preference tracking of a media playback system. The method may also involve sending, to one or more media services registered with the media playback system, one or more requests to suspend playback preference tracking from when the trigger that suspends playback preference tracking was detected. The method may also involve detecting a particular trigger that resumes playback preference tracking of the media playback system. The method may further involve, based on detecting the particular trigger, sending, to at least one of the one or more media services registered to the media playback system, one or more requests to resume playback preference tracking of the media playback system.

In yet another aspect, a device is provided. The device includes one or more processors, and a tangible data storage having stored therein instructions executable by the one or more processors to cause the playback device to perform operations. The operations may include detecting a trigger that suspends playback preference tracking of a media playback system. The operations may also include sending, to one or more media services registered with the media playback system, one or more requests to suspend playback preference tracking from when the trigger that suspends playback preference tracking was detected. The operations may also include detecting a particular trigger that resumes playback preference tracking of the media playback system. The operations may further include, based on detecting the particular trigger, sending, to at least one of the one or more media services registered to the media playback system, one or more requests to resume playback preference tracking of the media playback system.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing system comprising:
least one processor; and
at least one non-transitory computer-readable medium comprising, program instructions that are executable by the at least one processor such that the computing system is configured to:
    track playback preferences for a media playback system registered with a first account, wherein the playback preferences include a playback history indicating media items played back by the media playback system;
    receive, from, the media playback system, data indicating that the media playback system has entered a guest mode, wherein the guest mode enables one or more guest computing devices that are not registered with the first account to cause one or more media items to be added for playback by the media playback system; and
    based on the data, forgo tracking, for the media playback system, playback preferences associated with the one or more media items.

2. The computing system of claim 1, wherein the at least one non-transitory computer-readable medium farther comprises program instructions such that the computing system is configured to:
receive, from the media playback system, second data, indicating that the media playback system has exited the guest mode; and
resume playback preferences tracking for the media playback system based on the second data.

3. The computing system of claim 1, wherein:
the computing system is associated with a media streaming service; and
the first account is an account with the media streaming service.

4. The computing system of claim 3, wherein:
the at least one non-transitory computer-readable medium further comprises program instructions such that the computing system is configured to cause the media streaming service to provide media items for playback by the media playback system; and
the media items comprise the one or more media items.

5. The computing system of claim 3, wherein tracking the playback preferences comprises tracking the playback preferences by the media streaming service.

6. The computing system of claim 3, wherein the playback history indicates only media items played back by the media playback system via the media streaming service.

7. The computing system of claim 3, wherein:
the media playback system is associated with one or more media content sources; and
the one or more media content sources comprise one or more of: the media streaming service, a second media streaming service, a server, a user device, a playback device of the media playback system, or a control device of the media playback system.

8. The computing system of claim 1, wherein:
the media playback system comprises a control device registered with the first account; and
receiving the data from the media playback system comprises receiving the data from the control device.

9. The computing system of claim 8, wherein the media playback system comprises at least one playback device different than the control device.

10. A non-transitory computer-readable medium having stored thereon instructions executable by one or more processors to cause a computing system to perform functions comprising:
- tracking playback preferences for a media playback system registered with a first account, wherein the playback preferences include a playback history indicating media items played back by the media playback system;
- receiving, from the media playback system, data indicating that the media playback system has entered a guest mode, wherein the guest mode enables one or more guest computing devices that are not registered with the first account to cause one or more media items to be added for playback by the media playback system; and
- based on the data, forgoing tracking, for the media playback system playback preferences associated with the one or more media items.

11. The non-transitory computer-readable medium of claim 10, further comprising instructions to cause the computing system to perform functions comprising:
- receiving, from the media playback system, second data indicating that the media playback system has exited the guest mode; and
- resuming playback preferences tracking for the media playback system based on the second data.

12. The non-transitory computer-readable medium of claim 10, wherein:
- the computing system is associated with a media streaming service; and
- the first account is an account with the media streaming service.

13. The non-transitory computer-readable medium of claim 12, further comprising instructions to cause the computing system to cause the media streaming service to provide media items for playback by the media playback system, wherein the media items comprise the one or more media items.

14. The non-transitory computer-readable medium of claim 12, wherein tracking the playback preferences comprises tracking the playback preferences by the media streaming service.

15. The non-transitory computer-readable medium of claim 12, wherein the playback history indicates only media items played back by the media playback system via the media streaming service.

16. The non-transitory computer-readable medium of claim 12, wherein;
- the media playback system is associated with one or more media content sources; and
- the one or more media content sources comprise one or more of: the media streaming service, a second media streaming service, a server, a user device, a playback device of the media playback system, or a control device of the media playback system.

17. The non-transitory computer-readable medium of claim 10, wherein:
- the media playback system comprises a control device registered with the first account; and
- receiving the data from the media playback system comprises receiving the data from the control device.

18. The non-transitory computer-readable medium of claim 17, wherein the media playback system comprises at least one playback device different than the control device.

19. A method to be performed by a computing system, the method comprising:
- tracking playback preferences for a media playback system registered with a first account, wherein the playback preferences include a playback history indicating media items played back by the media playback system;
- receiving, from the media playback system, data indicating that the media playback system has entered a guest mode, wherein the guest mode enables one or more guest computing devices that are not registered with the first account to cause one or more media items to be added for playback by the media playback system; and
- based on the data, forgoing tracking, for the media playback system, playback preferences associated with the one or more media items.

20. The method of claim 19, further comprising:
- receiving, from the media playback system, second data indicating that the media playback system has exited the guest mode; and
- resuming playback preferences tracking for the media playback system based on the second data.

* * * * *